US009134600B2

(12) United States Patent
Dodd (10) Patent No.: US 9,134,600 B2
(45) Date of Patent: Sep. 15, 2015

(54) LARGE SCREEN DISPLAY DRIVE MECHANISM AND TRUSS

(75) Inventor: Mark C. Dodd, Pendleton, IN (US)

(73) Assignee: Tyler Truss Systems, Inc., Pendleton, IN (US)

( * ) Notice: Subject to any disclaimer, the term of this patent is extended or adjusted under 35 U.S.C. 154(b) by 213 days.

(21) Appl. No.: 13/602,620

(22) Filed: Sep. 4, 2012

(65) Prior Publication Data

US 2013/0075518 A1   Mar. 28, 2013

Related U.S. Application Data

(60) Provisional application No. 61/537,615, filed on Sep. 22, 2011.

(51) Int. Cl.
*B65H 75/48* (2006.01)
*G03B 21/58* (2014.01)

(52) U.S. Cl.
CPC ..................... *G03B 21/58* (2013.01)

(58) Field of Classification Search
USPC ............ 242/390, 390.2, 557, 598, 598.5, 403
See application file for complete search history.

(56) References Cited

U.S. PATENT DOCUMENTS

| | | | | |
|---|---|---|---|---|
| 470,346 | A * | 3/1892 | Bodenbrown, Jr. ......... | 400/615.1 |
| 2,339,668 | A * | 1/1944 | Baldwin et al. .............. | 242/390 |
| 3,684,178 | A * | 8/1972 | Friedlander ................. | 239/745 |
| 3,822,834 | A * | 7/1974 | Fjarlie ......................... | 242/388.5 |
| 3,934,854 | A * | 1/1976 | Goode ................... | 254/134.3 R |
| 4,012,001 | A * | 3/1977 | Knox ......................... | 242/388.7 |
| 4,204,354 | A * | 5/1980 | Kane ................................ | 43/4.5 |
| 4,436,190 | A * | 3/1984 | Wentzell .................. | 191/12.2 R |
| 4,587,383 | A * | 5/1986 | Stoldt ......................... | 191/12 R |
| 4,796,862 | A * | 1/1989 | Peppel ......................... | 254/277 |
| 4,806,047 | A * | 2/1989 | Morrison ..................... | 404/118 |
| 4,830,300 | A * | 5/1989 | Taylor et al. ................. | 242/390 |
| 5,095,841 | A * | 3/1992 | Santos et al. ..................... | 441/3 |
| 5,139,751 | A * | 8/1992 | Mansfield et al. ............ | 422/292 |
| 5,385,314 | A * | 1/1995 | Hughes ....................... | 242/397.3 |
| 5,419,508 | A * | 5/1995 | Pierce .......................... | 242/386 |
| 5,582,216 | A * | 12/1996 | Smith et al. .................. | 140/107 |
| 5,610,346 | A * | 3/1997 | Stelts ........................... | 73/866.5 |
| 5,717,424 | A * | 2/1998 | Simson et al. ................ | 345/110 |

(Continued)

FOREIGN PATENT DOCUMENTS

| | | |
|---|---|---|
| EP | 1798709 A1 | 6/2007 |
| JP | 10176472 | 6/1998 |

(Continued)

OTHER PUBLICATIONS

US PCT Search Report—PCT/US2012/053780.

*Primary Examiner* — Emmanuel M Marcelo
*Assistant Examiner* — Michael Gallion
(74) *Attorney, Agent, or Firm* — Woodard, Emhardt, Moriarty, McNett & Henry LLP (57) ABSTRACT

A large screen display drive mechanism. A drum is rotatably mounted to a truss by an axle that extends centrally through the drum and mounted by bearings, in turn, mounted to the truss. A large screen display is wrappable on the drum and is electrically connected by a cable assembly extending through the drum and outwardly thereof through a sprocket fixedly mounted to an end of the drum. The cable assembly is wrapped around a portion of the axle extending outwardly of the drum. A motor with sprocket and chain drives the sprocket attached to the drum.

13 Claims, 7 Drawing Sheets

(56) References Cited

U.S. PATENT DOCUMENTS

| | | | |
|---|---|---|---|
| 5,720,573 A * | 2/1998 | Benedict et al. | 405/21 |
| 5,900,850 A * | 5/1999 | Bailey et al. | 345/55 |
| 5,944,443 A * | 8/1999 | Benedict | 405/21 |
| 5,967,496 A * | 10/1999 | Ulrich et al. | 254/326 |
| 6,009,927 A * | 1/2000 | Peters | 156/577 |
| 6,053,449 A * | 4/2000 | Wolf et al. | 242/474.5 |
| 6,082,433 A * | 7/2000 | Vafaie et al. | 160/310 |
| 6,362,801 B1 * | 3/2002 | Yuhara | 345/82 |
| 6,457,902 B1 * | 10/2002 | Artzberger et al. | 404/75 |
| 6,497,267 B1 * | 12/2002 | Azar et al. | 160/310 |
| 7,111,803 B2 * | 9/2006 | Mott et al. | 242/397.4 |
| 7,281,565 B2 * | 10/2007 | Carmen et al. | 160/310 |
| 7,325,356 B2 * | 2/2008 | Norman et al. | 43/8 |
| 7,821,479 B2 * | 10/2010 | Zhang | 345/82 |
| 8,376,581 B2 * | 2/2013 | Auld et al. | 362/249.02 |
| 8,596,616 B1 * | 12/2013 | Soot | 254/394 |
| 2003/0041548 A1 * | 3/2003 | Merrifield | 52/646 |
| 2003/0072614 A1 * | 4/2003 | Benedict et al. | 405/15 |
| 2007/0026694 A1 * | 2/2007 | Mayer | 439/13 |
| 2008/0030853 A1 * | 2/2008 | Creel | 359/461 |
| 2008/0055106 A1 * | 3/2008 | Zhang | 340/815.45 |
| 2009/0139122 A1 * | 6/2009 | Le Gall et al. | 40/518 |
| 2009/0146919 A1 * | 6/2009 | Kline et al. | 345/46 |
| 2010/0200688 A1 * | 8/2010 | Gordon et al. | 242/390.2 |
| 2010/0219279 A1 * | 9/2010 | Doring | 242/390.2 |
| 2010/0224844 A1 * | 9/2010 | Boussaton et al. | 254/290 |
| 2011/0215992 A1 * | 9/2011 | Kline et al. | 345/46 |
| 2011/0280702 A1 * | 11/2011 | Lai et al. | 414/758 |
| 2012/0002357 A1 * | 1/2012 | Auld et al. | 361/679.01 |
| 2013/0161477 A1 * | 6/2013 | Kempf | 248/674 |
| 2014/0076533 A1 * | 3/2014 | Witte et al. | 166/77.2 |

FOREIGN PATENT DOCUMENTS

| WO | WO 2005/078229 A1 | 8/2005 |
|---|---|---|
| WO | WO 2010/054380 | 5/2010 |

* cited by examiner

LARGE SCREEN DISPLAY DRIVE MECHANISM AND TRUSS

This application claims the benefit of U.S. Provisional Application No. 61/537,615, filed Sep. 22, 2011 which is hereby incorporated by reference.

BACKGROUND OF THE INVENTION

1. Field of the Invention

The present invention relates generally to the field of devices for holding a large display screen in a rolled-up condition while allowing the screen to be extended therefrom.

2. Description of the Prior Art

A large screen portable LED display is disclosed in International Application No. PCT/US2009/063884, the associated International Publication No. WO2010/054380 and International Application No. PCT/US2012/0002357 which are hereby incorporated by reference in their entirety. In the PCT application, a large screen display includes a plurality of rigid segments containing LEDs. The rigid segments are linked by hinges or cables so the display is flexible and can be rolled up for storage and transport. The display can then be unrolled and extended from a protective container.

Large screen displays may be suspended from the ceiling or other structure for use at sporting events and other public gatherings. During use, the screen is deployed downwardly whereas it may be rolled upwardly into the container when not in use thereby protecting the display screen. Significant problems exist concerning the mechanism for unwinding and winding up the screen. For example, many screens weigh in excess of 1,500 pounds and extend wrappingly around a long wind-up axle. In some cases, the axle may have a length of 10 feet or more. Thus, if the winding force is applied directly to the axle, the axle may twist causing delayed movement, jamming, and even eventual failure of the axle. In lieu of locating the driving axle of the driver motor along the same axis of rotation as the axis of rotation of the wind up mechanism, I have located the motor and its output axle outwardly of the wind up mechanism axis of rotation thereby providing a mechanical advantage. Disclosed herein is a drum surrounding the wind up axle with the wind up force being applied through the drum outwardly of the axle eliminating axle twisting, and also providing a mechanical advantage when winding the drum allowing for a small driver motor.

The device disclosed herein further includes a truss surrounding the rotatable drum with the large screen display wrapped on the drum and extendable therefrom. The weight of the large screen display is directed through the drum axle to a pair of bearings mounted to plates fixedly secured to a truss. Likewise, the forces directed from the drum during the winding process are directed through a driving sprocket to the truss.

A further problem of the prior art screen display wind up mechanism relates to the routing of the electrical cable connecting the displays, LEDs, etc. to the incoming source of data and power located outwardly of the wind up mechanism. Due to the high frequency of the incoming data, unacceptable results are obtained when using a slip ring type of cable connector connecting the cable exiting the wind up mechanism to the external source of data and power. It is therefore necessary to use a non-sliding connection. The result of using a non-sliding type of connection is the possible twisting of the cable during rotation of the wind-up drum during either extension or retraction of the large screen display. Disclosed herein is a cable that exits the wind up mechanism through the drum end and driving sprocket and moves therewith. The cable spirals around the axis of rotation a sufficient number of turns to prevent the twisting and snarling of the cable.

SUMMARY OF THE INVENTION

A device to store, hold and extend a large screen display. A drum upon which the large screen display is mounted includes an axle that has opposite ends rotatably mounted to a pair of bearing in turn mounted to end plates of a truss. Rotation of the drum causes extension and retraction of the large screen display from the drum and truss. A cable assembly attachable to the large screen display extends through the drum rotating therewith. A driven sprocket mounted to an end of the drum is engaged by a chain in turn driven by a driver sprocket. The cable assembly extends from the drum, through the sprocket and is connectable to the source of data for the large screen display. The cable assembly is wrapped around an outer portion of the axle that is located outwardly from the drum thereby preventing the cable assembly from snarling as the drum is rotated with cable assembly wrapping and unwrapping on the outer portion of the axle as the drum is rotated respectively to retract and extend the large display screen.

It is an object of the present invention to provide a device to store, hold and extend a large screen display that will prevent the cable assembly of the large screen display from snarling as the display is extended and retracted while allowing for a fixed and immovable external connection to the cable assembly.

A further object of the present invention is to provide a structure to dissipate the weight and winding force of a large screen display and its cable initially applied to a rotatable drum holding same.

An additional object of the present invention is to provide a new and improved structure to store, extend and retract a large screen display.

Related objects and advantages will be apparent from the following description.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
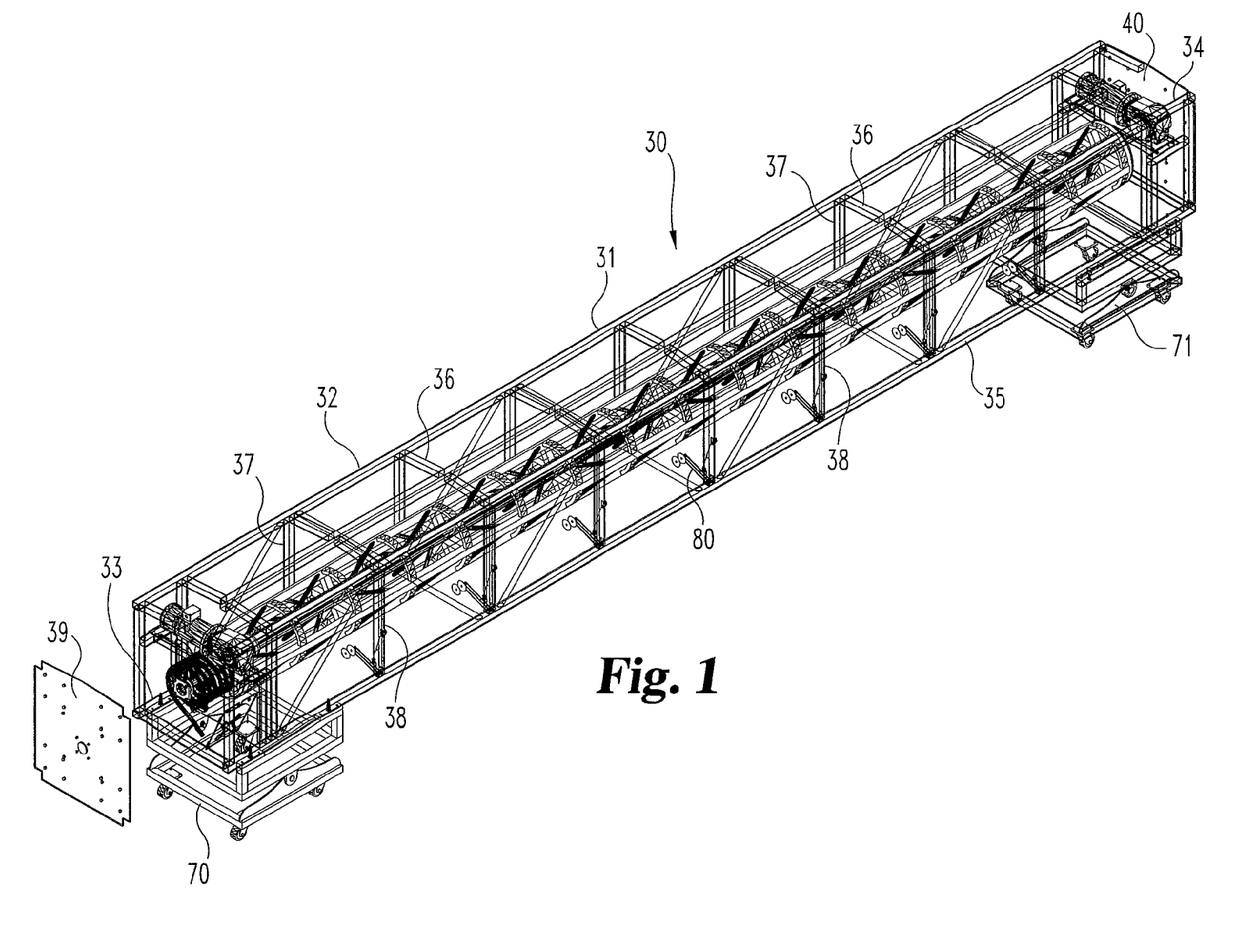
FIG. 1 is a fragmentary, perspective view of a drive mechanism and truss for holding a screen display either in a wrapped condition or an extended position.
Figure 2:
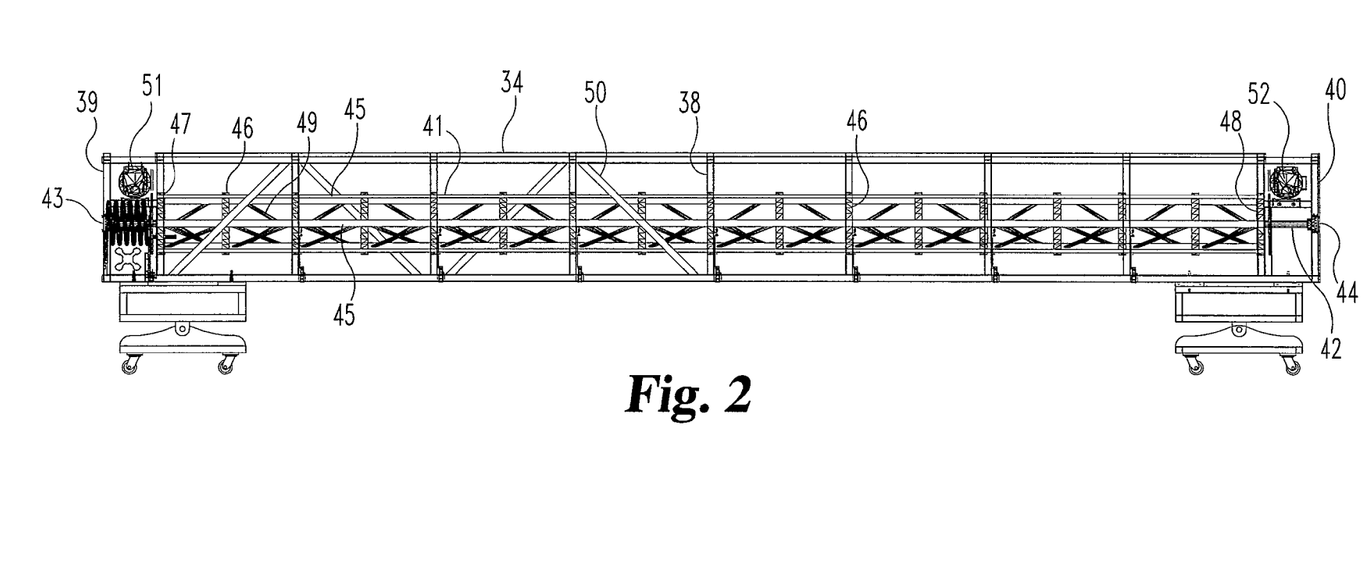
FIG. 2 is a side view thereof.
Figure 3:
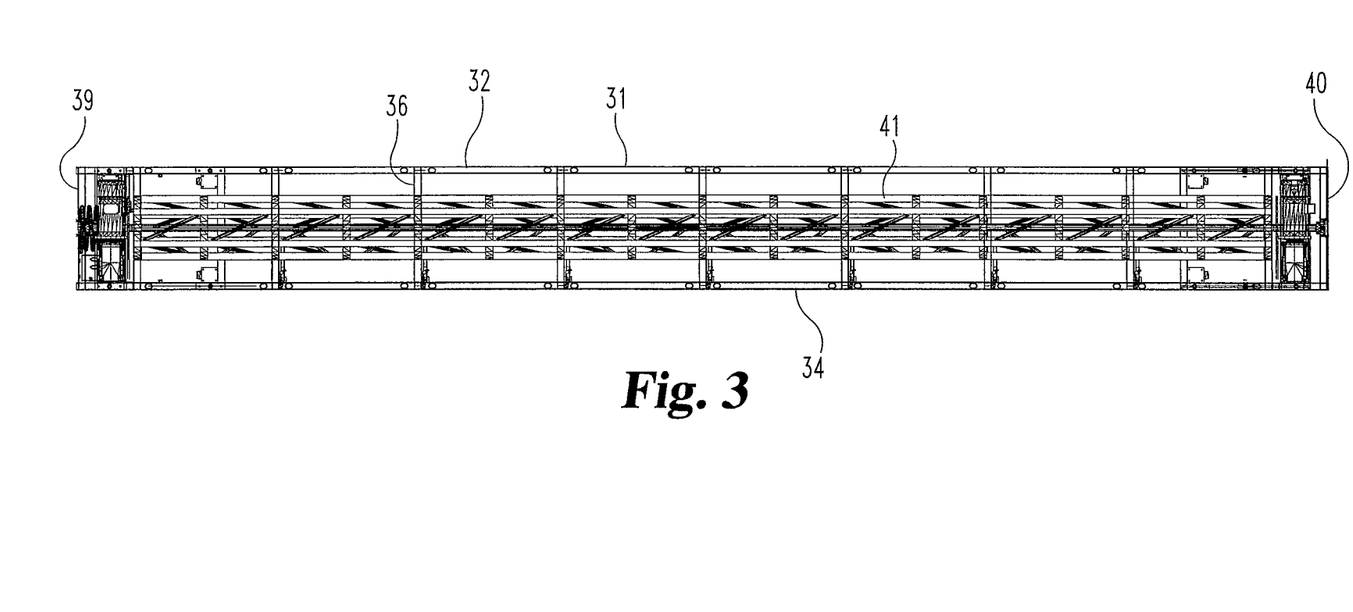
FIG. 3 is a top view thereof.

Referring now more particularly to FIGS. 1-3, there is shown a device 30 for holding a large screen display which is wrapped around a rotatable drum within a truss to store and then extend and retract the screen as needed. The large screen display is not shown in FIGS. 1-3 to more clearly illustrate the holding structure. Device 30 includes a truss 31 having four longitudinally extending members 32, 33, 34, and 35 with each member being located at one of the longitudinally extending edges of the truss. A plurality of cross members 36 have their opposite ends fixedly attached to the top of cross members 32 and 34. Further, a plurality of downwardly extending members 37 are located on one side of the truss having their opposite ends fixedly attached to members 32 and 33. Likewise, a plurality of downwardly extending members 38 are located on the opposite side of the truss having their opposite ends fixedly attached to longitudinally extending members 34 and 35. A pair of end plates 39 and 40 are located at the opposite ends of the truss and are fixedly connected to the opposite ends of members 32-35. The bottom of the truss is open, that is, members 33 and 35 are not connected together by horizontally extending cross members, thereby allowing the large screen display to extend downwardly from the truss.

Figure 4:
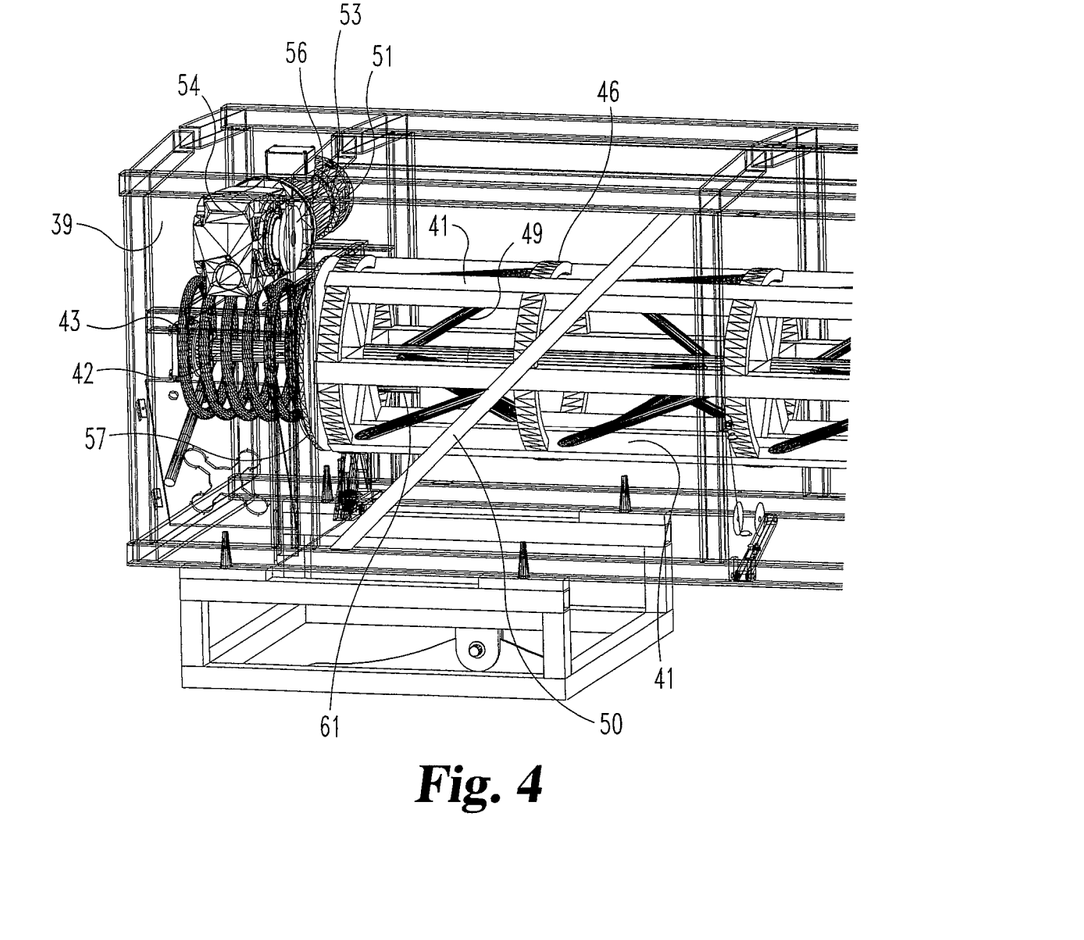
FIG. 4 is an enlarged, fragmentary, perspective view of the left end of the truss and drive mechanism.

A rotatable drum 41 (FIGS. 2 and 3) is positioned within truss 31. The drum has an axle 42 extending the length of the drum and the truss with the opposite ends of the axle being rotatably received in a pair of bearings 43 and 44 fixedly mounted respectively to truss plates 39 and 40. Drum 41 includes a plurality of ribs 45 extending the length of the drum being parallel to the axis of rotation of axle 42. A plurality of rings 46 are fixedly secured to ribs 45 and are arranged perpendicular to the axle axis of rotation. The rings and ribs cooperatively form a cylinder upon which the large screen display may be wrapped. The opposite ends of the ribs 45 are fixedly secured to end plates 47 and 48 located at the opposite end portions of the drum. In order to increase the strength and rigidity of drum 41, a plurality of internally located cross braces 49 (FIG. 4) have their opposite ends fixedly attached to ribs 41. Likewise, in order to increase the strength and rigidity of truss 31, a plurality of cross braces 50 have their opposite ends attached to the longitudinally extending members 31-35.

A pair of drive mechanisms 51 and 52 (FIG. 2) are mounted to truss 31 at the opposite end portions of the truss. Each drive mechanism includes a motor and gear box having a rotatable output sprocket with an axis of rotation offset from the axis of rotation of drum axle 42. Drive mechanism 51 will now be described, it being understood that an identical description applies to drive mechanism 52. Drive mechanism 51 (FIG. 4) has an electric motor 53 with a gear box 54 mounted atop shelf 55 (FIG. 5) secured to truss 31. A drive sprocket 56 is rotatably driven by the output shaft of the gear box and is connected by an endless chain which in turn is engaged and wraps around drum sprocket 57 fixed to the end of drum 31. Thus, operation of motor 53 results in rotation of sprocket 56 and in turn rotation of sprocket 57 and drum 31 about the axis of rotation of axle 42. An identical motor, gear box, output sprocket, endless chain are located at the opposite end of truss 31 adjacent end plate 40 with the chain engaged with a large sprocket attached to the adjacent end of drum 31. The drive mechanisms at each end are coordinated to rotate the opposite ends of the drum in unison. Notably, the drive sprocket, sprocket 56 in the case of drive mechanism 51, is located off center with respect to the axis of rotation of axle 42 with the diameter of sprocket 57 approximating the diameter of drum 41 and greater than the diameter of sprocket 56 thereby providing a mechanical advantage allowing for a relative low horsepower motor to rotate the drum even though a heavy screen display is mounted thereon. In one embodiment, each motor is rated a ½ horsepower.

Sprocket 57 is fixedly mounted to drum end plate 47 (FIG. 5) by struts having their opposite ends attached to sprocket 57 and plate 47 thereby distributing force from the drum to the sprocket in turn to truss 31. Thus, sprocket 57 rotates in unison with drum 31. Cable 61 extends through an opening provided in end plate 47 thereby exiting the drum. The cable then passes through an opening in sprocket 57 and is wrapped around axle 42 outwardly of the drum. The end 62 of cable 61 is provided with a conventional connector 66 that is stationary even though the drum is rotating connecting the cable 61 to cable 63 that is routed to the source of electrical power and data so that the data can flow inward through the sprocket, drum and to the display features including the LEDs. PCT application PCT/US2009/063884 and its published Publication No. WO2010/054380 discusses the connection of the incoming cable to the various display items including the LEDs.

Figure 5:
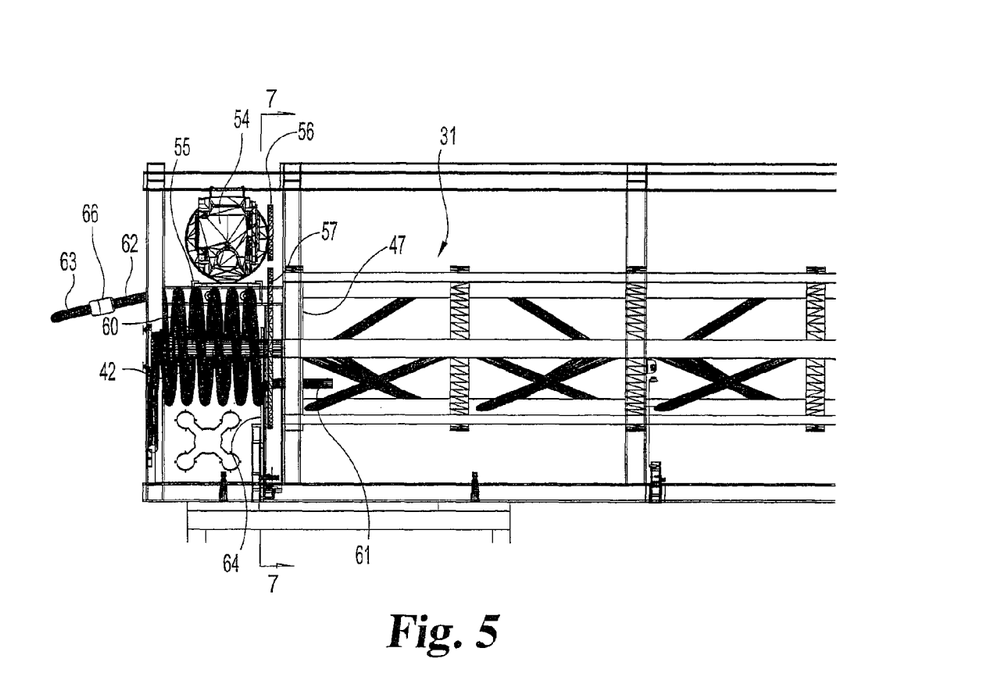
FIG. 5 is a enlarged, fragmentary, side view of the truss and drive mechanism shown in FIG. 4.

In one embodiment, the diameter of the drum is such that four complete revolutions of the drum results in complete extension of the large screen display. Likewise, by reversing the rotation of the drum by four revolutions, the screen is retracted into the truss and wrapped on the drum. By wrapping cable 61 on axle 42, a total of five revolutions as depicted in FIG. 5, a sufficient cable length is provided to enable the required revolutions of the drum axle without stretching, breaking or snarling the cable. Thus, a fixed connection between the cables 61 and 62 is achieved.

Plate 64 (FIG. 5) is mounted to the truss and extends upwardly external to drum 41 and at least partially around axle 42. Plate has a width equal to or greater than the diameter of the coil formed by cable 61 on axle 42 thereby limiting movement of the cable and coil toward the chain connecting sprockets 56 and 57 together. Plate 64 is provided with an opening through which cable 61 freely passes.

Figure 6:
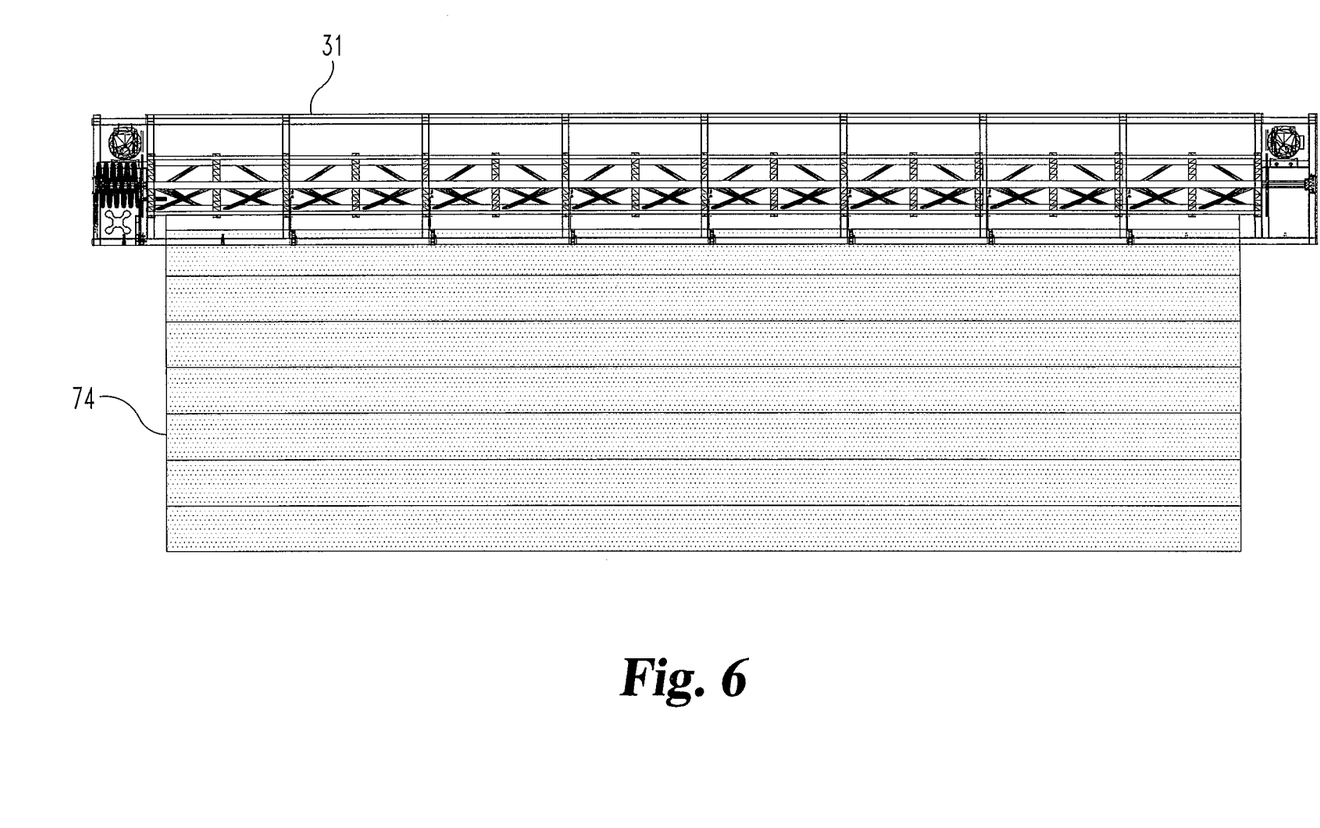
FIG. 6 is a side view of the device with a large screen display extending therefrom.
Figure 7:
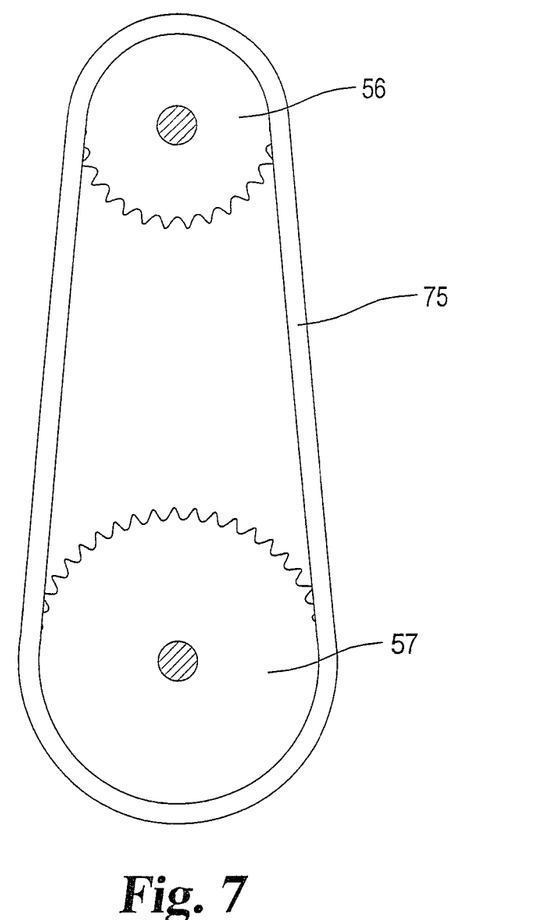
FIG. 7 is an enlarged cross-sectional view taken along the line 7-7 of FIG. 5 and viewed in the direction of the arrows.

A plurality of spring biased rollers 80 (FIG. 1) are mounted to the bottom of the truss and slidingly engage the large screen display 74 (FIG. 6) as the large screen display moves downwardly and upwardly relative to the screen. Rollers 80 insure the proper positioning of the display and limit movement of the bottom of the display from moving over the top of the drum.

A pair of carriages 70 and 71 are positioned beneath the opposite ends of truss 31. Each carriage has a plurality of wheels extending downwardly to engage the floor, pavement or other support surface allowing the truss and drum to be easily moved to the location where the truss and drum are hoisted upwardly. A plurality of upwardly extending pins from each carriage are matingly received by truss 31 with the truss automatically disengaging the pins as the truss is lifted upward separating the carriages from the truss. The carriages may then be stored until ready for use.

The drive motors each have a drive shaft with a driving sprocket fixedly mounted thereon with the drive motors, drive shafts and driving sprockets located outwardly to the side of the drum axle longitudinal axis. Further the driven sprocket fixed to the drum has an outer periphery likewise located to the side of the drum axle longitudinal axis with the outer periphery of the driven sprocket 57 engaged by a continuous chain 75 also engaged with the driving sprocket 56 whose axis of rotation is located outwardly and to the side of the drum axle axis of rotation. Thus, the rotational force applied to the drum is applied outwardly of the longitudinal axis of the axle limiting twisting of the axle. The cable segment located within the drum is mounted to the drum to rotate therewith while the outer segment of the cable located outwardly of the driven sprocket winds and unwinds around the portion of the axle located outward of the driven sprocket while the large screen display is retracted and extended from the mechanism. The axle is supported by bearings mounted to the truss thereby transferring the weight of the large screen display to the truss via the bearings.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A large screen display drive mechanism comprising:
   a frame including a stationary truss having a truss axis and bearings, said truss having a plurality of elongated members extending parallel and horizontal to the truss axis, said truss further having cross members attached to and spacing apart said members, said elongated members and cross members defining a top, opposite sides, and an open bottom forming a drum enclosure, said truss having opposite ends with said bearings mounted to said opposite ends;
   a drum located and extending between said elongated members and cross members and rotatable within said stationary truss for wrapping a large screen display thereon with the drum rotatably mounted to said truss to extend said display from said truss only through said open bottom and to retract said display within said truss, said drum having a first end and a second end and having length therebetween, said elongated members and cross members of said truss surround and completely enclose said drum within said drum enclosure of said truss along said length of said drum while said elongated members and said cross members extend across said top and said opposite sides protecting said drum from impact by external objects as the truss, display and drum are lifted and lowered in place;
   an axle extending through said bearings applying weight of the large screen display directed via said axle to said bearings and said truss, said axle having an longitudinal extending axis parallel to said truss axis, said axle mounted to said drum and having a main axle portion extending between said first end and said second end with said axle having a first end portion extending outwardly of said first end of the drum and rotating in unison about said axis with said main axle portion;
   a first drum sprocket fixedly mounted to said first end of said drum;
   a cable assembly having an interior segment located within said drum between said first end and said second end and having an exterior segment located outwardly of said first end, said interior segment connectable to a large screen display wrappable on said drum, said cable assembly extending through said first end of the drum and said first drum sprocket and then spiraling around said first end portion of said longitudinal extending axis of said axle outwardly of said first end of said drum, said cable assembly having an outer end that is stationary while said drum and interior segment of said cable assembly within said drum rotate in unison together while limiting relative motion of said interior segment of said cable relative to said drum;
   a first motor having a first drive sprocket thereon to drive said first drum sprocket and rotate said drum by applying driving force to said drum outwardly of said axle limiting axle twisting and allowing said exterior segment of said cable assembly to wind and unwind on said first end portion outwardly of said drum with said interior segment of said cable assembly rotating with and within said drum; and wherein:
   said axle has a second end portion extending outwardly of said second end of the drum, and further comprising:
   a second drum sprocket fixedly mounted to said second end of said drum; and,
   a second motor having a second drive sprocket thereon to drive said second drum sprocket and rotate said drum by applying driving force to said drum outwardly of said axle limiting axle twisting and allowing said cable assembly to wind and unwind on said second end portion.

2. The drive mechanism of claim 1 wherein:
   said truss has a first end plate and a second end plate secured thereto at opposite ends of said truss, said bearings are mounted on said first end plate and said second end plate through which said axle extends transferring load from said axle applied thereto by large screen display weight and said cable assembly to said truss via said bearings and first end plate and second end plate.

3. The drive mechanism of claim 2 wherein: said elongated members have ends attached to said first plate and said second plate.

4. The drive mechanism of claim 3 wherein:
   said drum has a plurality of rings spaced along said axle axis and located radially outward therefrom upon which a large screen display can be wrapped.

5. The drive mechanism of claim 1 wherein:
   said first drive sprocket and said second drive sprocket each have a sprocket axis of rotation offset from said axis of said axle with each drive sprocket smaller in diameter than said first drum sprocket and said second drum sprocket; and further comprising a first continuous chain and a second continuous chain engaged respectively with said first drive sprocket and said second drive sprocket and respectively said first drum sprocket and said second drum sprocket to impart rotation to said axle; and further comprising a plurality of rollers mounted to said truss to guide said display as said display is extended from said truss and retracted into said truss.

6. A mechanism comprising:
   a large screen display;
   a stationary truss having elongated members and cross members joined together forming a tubular shaped frame with a hollow interior and a longitudinal axis;
   a drum enclosed within said hollow interior and rotatable within said stationary truss with said large screen display thereon with the drum rotatably mounted to and positioned completely within said truss, said drum having a first end and a second end and extending along said axis;
   an axle having an longitudinal extending axis, said axle having an exterior segment and an interior segment, said interior segment mounted to said drum and extending between said first end and said second end, said exterior segment located outwardly of said first end of the drum;
   a drum sprocket fixedly mounted to said first end of said drum to rotate therewith;
   a cable connectable to said large screen display on said drum and positionable within said truss, said cable extending from within said drum and through said drum sprocket and then wrapping around said exterior segment of said axle and said longitudinal axis outwardly of said first end of said drum with said cable rotating together with said sprocket and drum on said axis when wrapping or unwrapping on said exterior segment; and, a motor having a drive shaft with a drive sprocket thereon to drive said drum sprocket and rotate said drum by applying driving force to said drum allowing said cable to wind and unwind on said exterior segment of said axle outwardly of said drum while said cable rotating with and within said drum.

7. The mechanism of claim 6 wherein:

said truss has bearings receiving said axle applying weight of the large screen display and said cable directed via said axle to said bearings and said truss.

8. The mechanism of claim 7 wherein:

said drive sprocket has a drive sprocket axis of rotation offset relative to said longitudinal axis of said axle and further comprising a continuous chain extending around said drive sprocket and said drum sprocket for rotation of said drum.

9. The mechanism of claim 8 wherein said interior segment and said exterior segment of said axle are integral.

10. A large screen display drive mechanism comprising:

a frame including a truss with a downward facing opening and having elongated members with said truss having a top and opposite sides;

a drum;

a large screen display positionable within said drum and extendable through said downward facing opening but not through said top or said opposite sides;

said drum enclosed within said truss between said top, said opposite sides and said bottom facing opening protecting said drum and large screen display from damage from external objects as said drum and display are lifted and lowered in place and having wrapped thereon said large screen display with the drum having an axis of rotation and rotatably mounted to said frame about said axis, said drum having a first end and a second end;

a drum sprocket fixedly mounted to said first end of said drum and rotatable therewith;

an elongated device located outwardly of said first end of the drum;

a cable assembly extending between said first end and said second end and being connectable to said large screen display wrapped on said drum, said cable assembly extending through said drum sprocket and then wrapping relative to said elongated device outwardly of said first end of said drum, said cable assembly including a cable rotating with said sprocket and drum on said axis when wrapping or unwrapping on said elongated device; and, a motor having a drive shaft with a drive sprocket thereon to drive said drum sprocket and rotate said drum by applying driving force to said drum allowing said cable assembly to wind and unwind on said elongated device outwardly of said drum while said large screen display to respectively retract and extend through said opening of said truss.

11. The mechanism of claim 10 wherein:

said elongated device is an axle upon which said drum is mounted with said axle extending between said first end and said second end of said drum and through said drum sprocket.

12. The mechanism of claim 11 and further comprising:

guide rollers mounted to said frame and extending there beneath to guide said large screen display as it is extended and retracted by said drum.

13. The mechanism of claim 12 wherein:

said truss has a pair of plates mounted thereto adjacent said first end and said second end of said drum, said plates include bearings engaged with said axle to transfer large screen display and cable assembly weight via said axle to said plates and said truss.

\* \* \* \* \*